Figure 1:
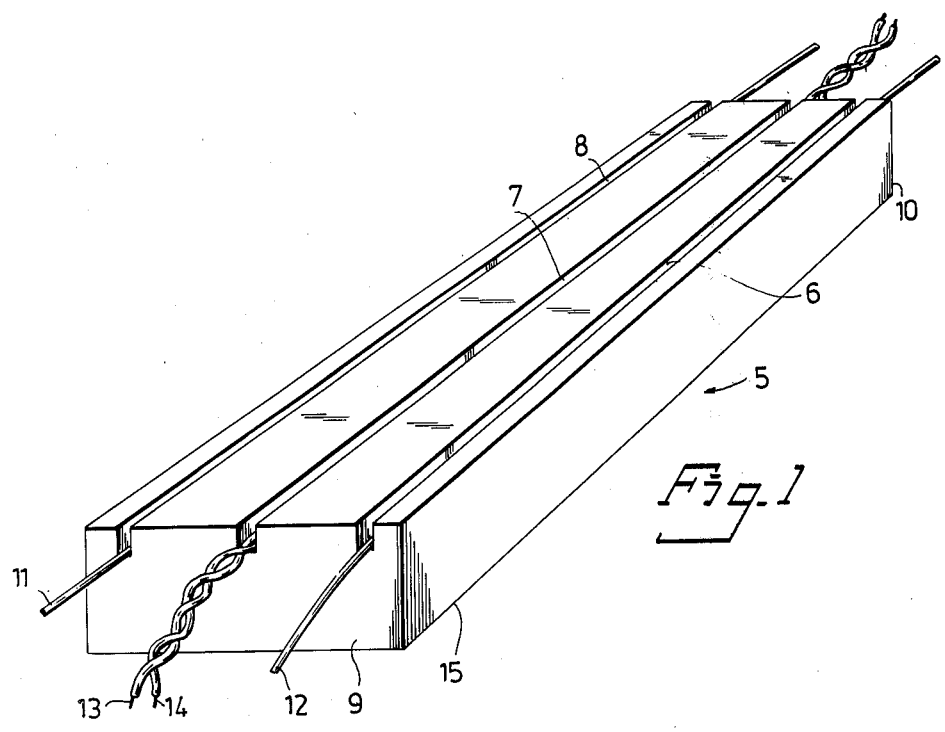

United States Patent [19]

Blom et al.

[11] 4,288,654

[45] Sep. 8, 1981

[54] DISTRICT-HEATING LINE

[76] Inventors: Hans Blom, Box 3158, S-103 63 Stockholm; Leif Wiberg, 15 Observatoriegatan, S-113 25 Stockholm, both of Sweden

[21] Appl. No.: 131,142

[22] Filed: Mar. 17, 1980

[30] Foreign Application Priority Data

Sep. 5, 1979 [SE] Sweden ............................. 7907400

[51] Int. Cl.³ .......................... F17D 5/06; F16L 55/00
[52] U.S. Cl. ................................ 174/47; 73/40.5 R; 137/551; 174/11 R; 340/605
[58] Field of Search .................. 174/11 R, 47, 96, 98, 174/110 F; 73/40.5 R, 49.1; 137/551; 138/33, 103, 104; 165/11 R; 200/61.04, 61.05; 219/301; 237/13; 324/52, 61 R, 65 R; 338/34, 35; 340/604, 605; 361/49

[56] References Cited

U.S. PATENT DOCUMENTS 2,360,434 10/1944 Manning ...................... 200/61.05 X
4,013,924 3/1977 Christensen et al. ......... 174/11 R X

FOREIGN PATENT DOCUMENTS 579184 6/1933 Fed. Rep. of Germany ........ 324/52
2640161 3/1978 Fed. Rep. of Germany .... 174/11 R
1377519 9/1964 France ......................... 73/40.5 R
1455415 11/1976 United Kingdom ................ 219/301
612102 6/1978 U.S.S.R. ............................. 137/551

Primary Examiner—Laramie E. Askin
Attorney, Agent, or Firm—Kinzer, Plyer, Dorn & McEachran

[57] ABSTRACT

A district heating line comprising an inner metal tube intended for the transfer of a heating medium and encircled by an insulating layer of foamed plastic. Arranged around the insulating layer is a moisture impenetrable protective tube. To enable an alarm to be given in the event of a fault in the line, elongated blocks are fixedly mounted on the outer cylindrical surface of the metal tube. The blocks are made of electrically insulating material. They each have at least one radially extending, outwardly opening channel on the outer surface thereof with the channels on adjacent blocks aligned with one another. The channels are dimensioned to accommodate the electrical conductor and position it at a fixed distance from the outer cylindrical surface of the inner metal tube. The conductor is secured in the aligned channels at the fixed distance from the outer cylindrical surface of the inner metal tube. A water soluble salt is incorporated in the electrically insulating blocks.

1 Claim, 2 Drawing Figures

DISTRICT-HEATING LINE

The present invention relates to a district-heating line of the kind comprising an inner metal tube for transporting a heat-transfer medium; an electrically insulating layer of foamed plastic arranged externally around the inner metal tube; a moisture impenetrable protective tube surrounding said insulating layer; and at least one electric conductor which is arranged to form part of an electric circuit through the insulating layer when said layer is moistened with an electrically conductive liquid.

District-heating lines of this kind are well known. In certain cases only one conductor is used, which together with the metal tube forms the electric circuit which, if an electrically conductive liquid should penetrate the foamed-plastic insulation as a result of, for example, a crack in the protective tube, is closed, whereupon a monitoring system connected between the conductor and the metal tube causes an alarm to be given. When water penetrates the foamed-plastic insulation, the alarm is given substantially irrespective of the distance of the conductor from the metal tube, although the moisture content required for releasing the alarm may vary within very wide limits, depending upon the content of water-soluble salts of the liquid, i.e. normally of the penetrating water. This means that in certain cases an alarm is not given until the line has suffered very serious moisture damage, while in other cases no alarm at all is given, owing to the fact that the conductivity of the water is too low. This latter problem has manifested itself by the fact that certain thermal power plants now use de-ionized water, which has a practically negligible conductivity. The current circuit for releasing an alarm is not positively established, irrespective of how much water penetrates the insulating layer, which means that the district-heating tube, or in certain cases the whole line, can be destroyed, It is therefore a prime object of the invention to provide a district-heating line of the kind mentioned in the introduction in which the aforementioned problems are completely eliminated and in which an alarm is positively given when a given, relatively low moistened content is reached.

This object is achieved in accordance with the invention by incorporating in the foamed plastic material a water-soluble salt, which when liquid penetrates the layer, forms an electrolyte which increases the conductivity of the liquid.

With a district-heating line of this kind, the electrical circuit through the foamed plastic will be established very rapidly and ensures that, under all circumstances, de-ionized water will form an electrolyte which current, for example, can pass between an electric conductor and the metal tube or between two conductors laid in the plastic.

In certain cases it may be suitable to incorporate the water-soluble salt in a foamed-plastic body surrounding the conductor or conductors, and which in turn forms the requisite electrolyte. By such a construction it is possible to prevent the water-soluble salt from coming into direct contact with the inner tube, which is preferably made of steel and which might be subjected to corrosion damage when exposed to excessively high salt concentration.

Figure 2:
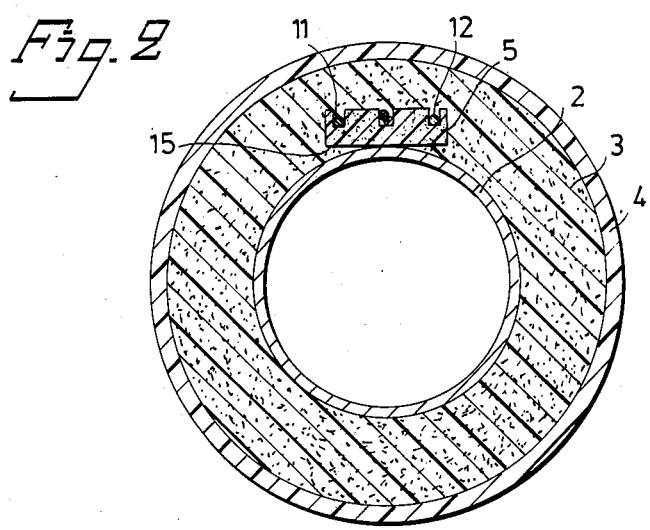

The invention will now be described in more detail with reference to the accompanying drawing, in which FIG. 1 is a perspective view of an elongate block having electric conductors laid therein, said block being intended to be cast in the layer of foamed plastic, and FIG. 2 illustrates the elongate block of FIG. 1 arranged in a district-heating line.

Prior to casting a foamed-plastic insulation 3 around a metal tube 2, one or more blocks 5 are mounted on the tube 2. The foamed-plastic insulating layer 3 is surrounded by an external, moisture impenetrable protective tube 4 made of a suitable plastic material or the like. Each of the blocks 5 can be securely fixed to the outer cylindrical surface of the metal tube 2 by glueing. If a plurality of blocks 5 are mounted in line with each other, the distance between the mutually opposing ends of the blocks shall be as small as possible. Each block 5 has arranged therein a number of axially extending channels, e.g. channels 6,7 and 8, said number corresponding to the number of conductors to be enclosed in the insulation 3. The insulation 3 normally comprises a polyurethane foamed plastic. Subsequent to mounting one block 5 on the outer cylindrical surface of the tube 2, or a plurality of mutually co-operating blocks, the conductors 11,12,13 and 14 are placed in the channels and tensioned by some suitable means, said conductors extending beyond the ends of the tube 2. Subsequent to inserting the metal tube 2, with the block or blocks 5 mounted thereon, into a protective tube 4 and centering said tube 2 in said protective tube, the foamed plastic 3 is cast into the annular space between the tubes. The conductors in the channels 6-8 are covered with the foamed plastic and are fixed in their respective positions and the block or blocks 5 held in position irrespective of the tensions and forces occurring when the insulation 3 solidifies.

Preferably the block 5 is made of a foamed plastic, preferably a plastic of the same kind as the insulation 3 and preferably of the same density. Incorporated in the block or blocks 5 is a given quantity of a water-soluble salt, such as sodium chloride. If water should penetrate the protective tube 4 and enter the foamed plastic 3, the water will raise the moisture content of the block 5 and, irrespective of the conductivity of the penetrating water, an electrolyte will be formed which has a concentration and conductivity such that a currect circuit is established, e.g. between the conductors 11 and 12. The amount of water-soluble salt incorporated in the foamed plastic of the block 5 can vary within wide limits and substantially depends upon the amount of moisture to be indicated.

In those cases when the inner tube 2 conducts water which is de-ionized and a crack occurs in the tube, the de-ionized water, which is thus electrically non-conducting, will penetrate the block 5 and cause a current circuit to be established between the alarm conductors. Thus, it is quite impossible for non-ionized water to pierce the inner tube 2 without an alarm being given.

The aforedescribed embodiment is particularly suitable because the water-soluble salt is incorporated in a well-defined body in the foamed-plastic insulation, and because the outer surface of the steel tube 2 is subjected to the least possible corrosion damage if, for some reason, the salt mixture in the foamed plastic is excessively high. It is also possible, however, to incorporate the water-soluble salt also in the foamed-plastic insulation 3 or solely in said plastic insulation when the aforedescribed elongate blocks 5 are not used.

The water-soluble salt can be mixed directly in one of the liquids used for forming the foamed plastic or may be added when pouring or injecting the foamed plastic material into the annular chamber between said tubes 2 and 4, to form the plastic layer 3.

We claim:

1. A district heating line of the kind including an inner metal tube for transporting a heat transfer medium, an insulating layer of foamed-plastic material arranged around the metal tube, a moisture impenetrable protective tube surrounding said foamed-plastic layer, at least one electrical conductor formed as part of an electrical circuit, elongated blocks mounted on and affixed to the inner metal tube along the length of the tube, said blocks being made of electrically insulating material and having extending along the length thereof at least one radially outwardly opening channel with the channels on adjacent blocks aligned with one another, said channels being dimensioned to accommodate said electrical conductor and position it at a fixed distance from the outer cylindrical surface of the inner metal tube, means securing said electrical conductor in said channels at said fixed distance from the outer cylindrical surface of the inner metal tube, and a water soluble salt incorporated in said electrically insulating blocks.

* * * * *